Nov. 15, 1966  L. MEYERHOFF  3,285,011
HYDRAULIC TORQUE CONVERSION APPARATUS
Filed Feb. 25, 1960  6 Sheets-Sheet 1
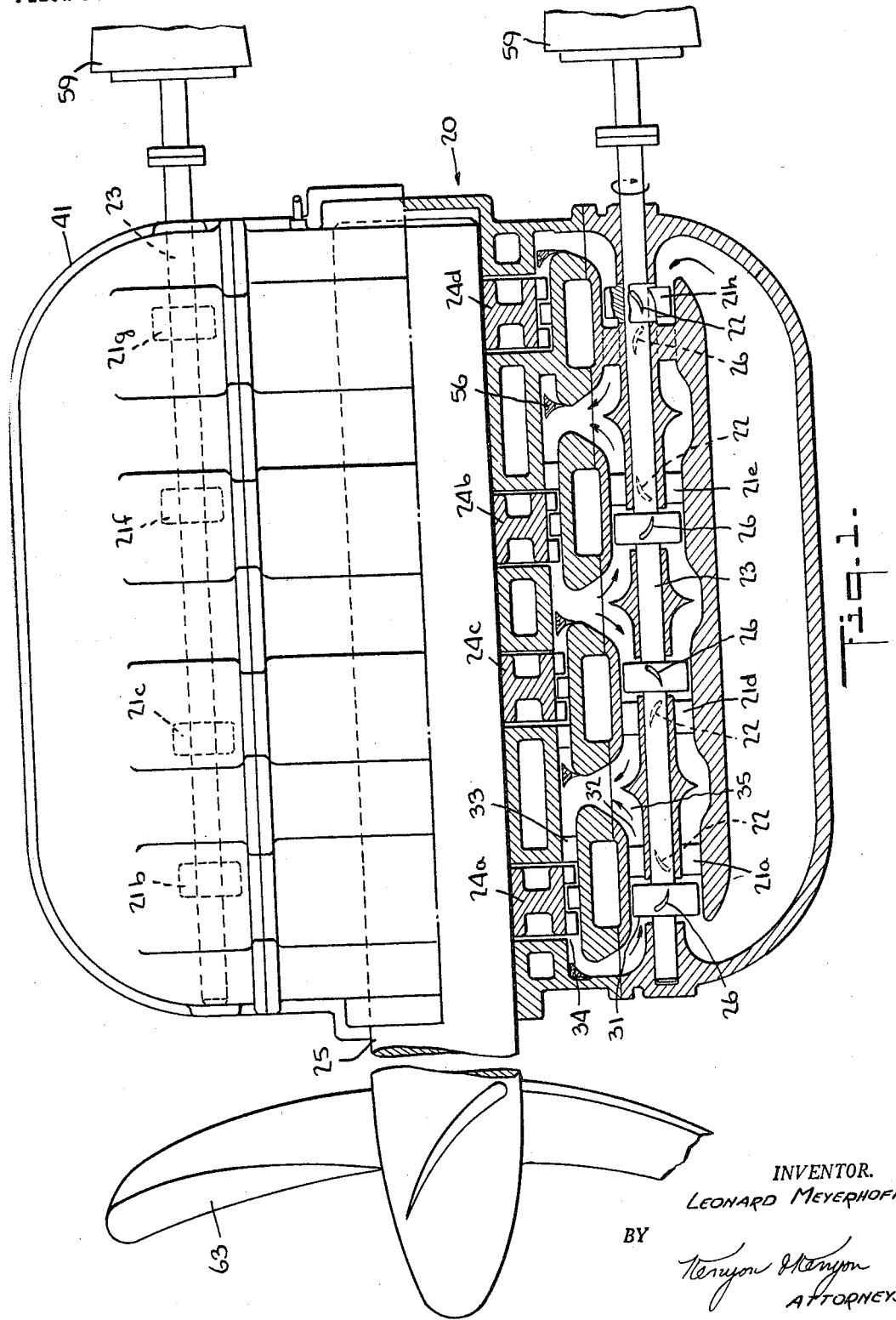
INVENTOR.
LEONARD MEYERHOFF
BY
Kenyon & Kenyon
ATTORNEYS Nov. 15, 1966 L. MEYERHOFF 3,285,011
HYDRAULIC TORQUE CONVERSION APPARATUS
Filed Feb. 25, 1960 6 Sheets-Sheet 2
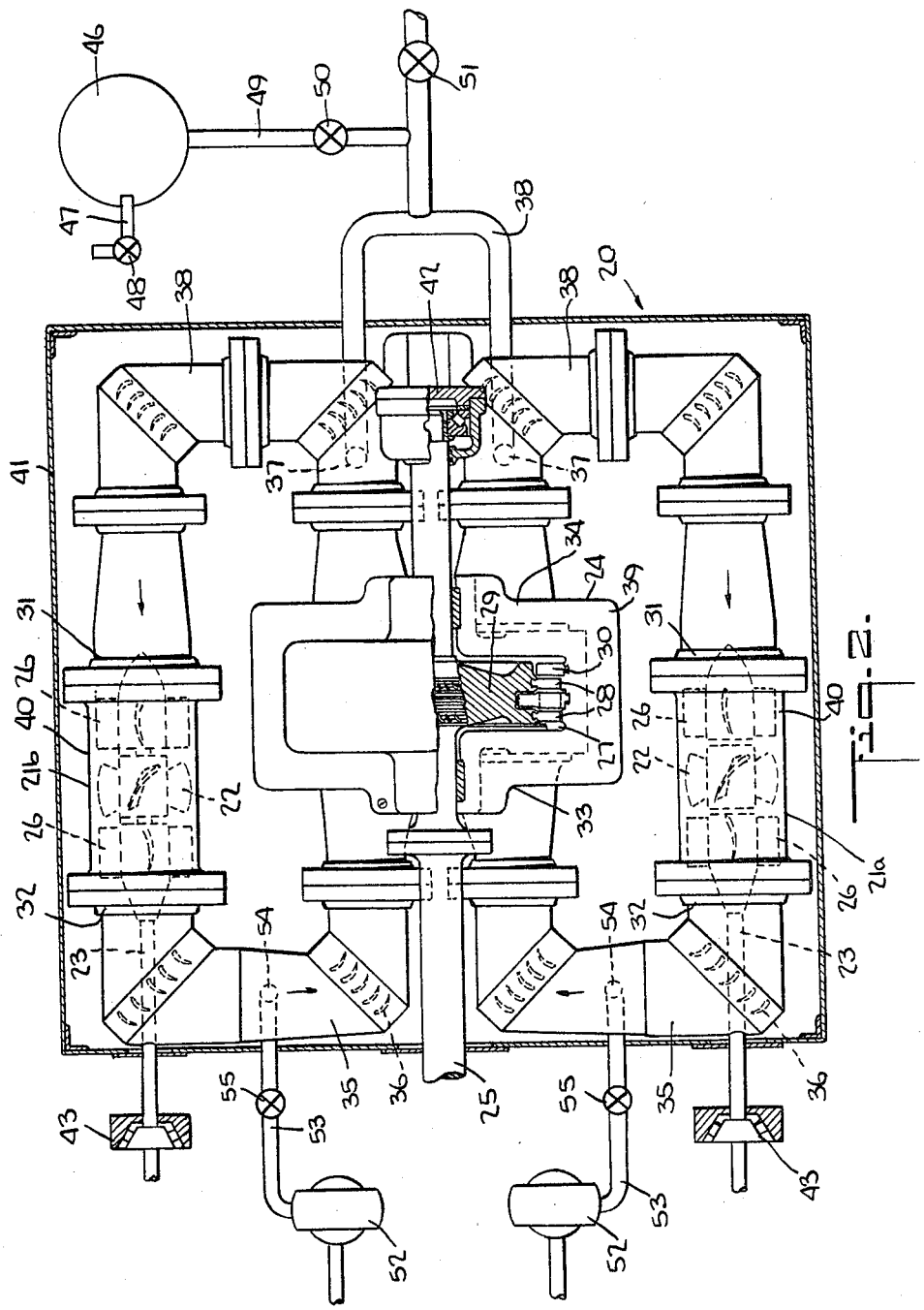
INVENTOR.
LEONARD MEYERHOFF
BY
Kenyon & Kenyon
ATTORNEYS

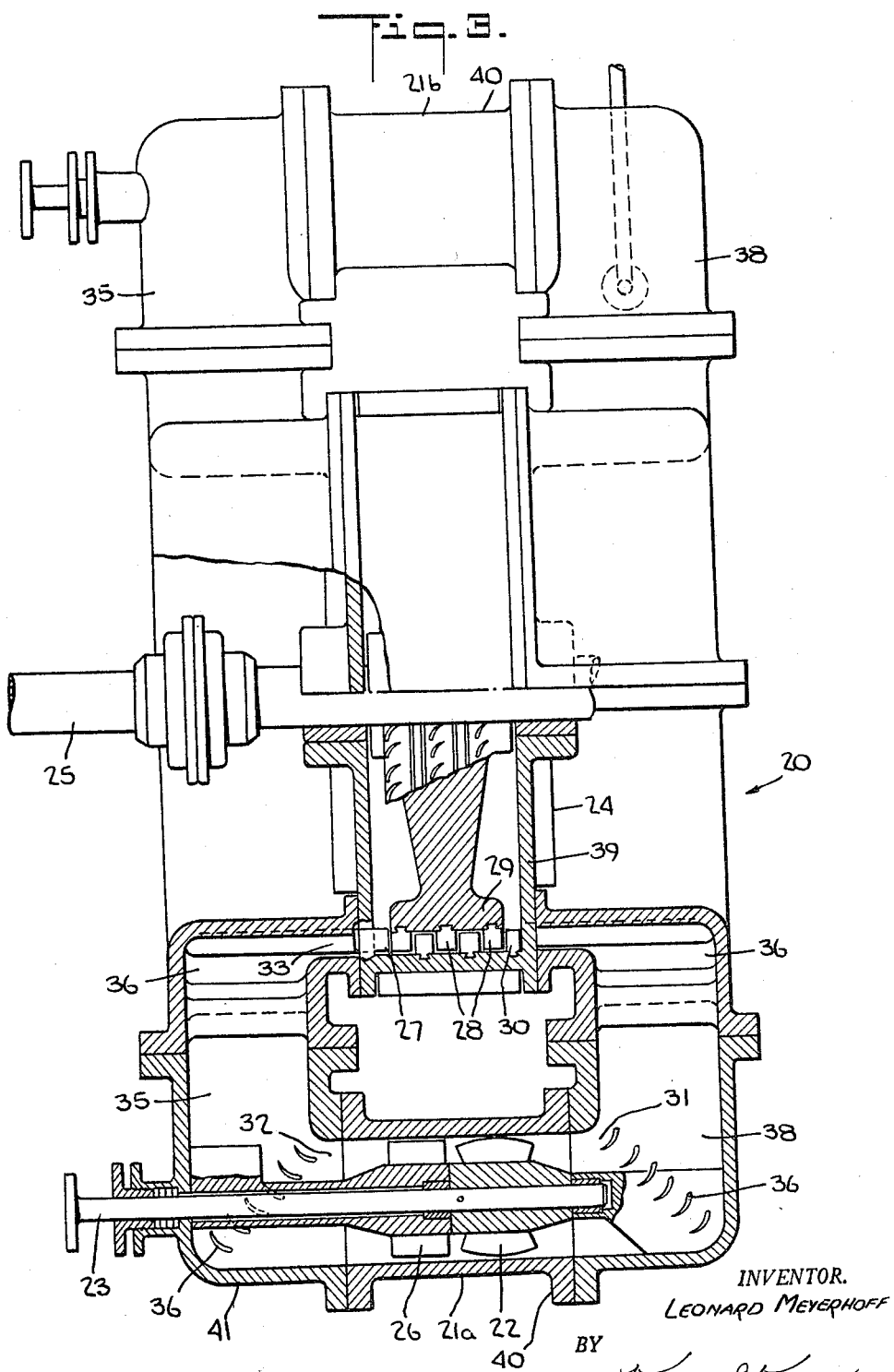

Nov. 15, 1966  L. MEYERHOFF  3,285,011
HYDRAULIC TORQUE CONVERSION APPARATUS
Filed Feb. 25, 1960  6 Sheets-Sheet 4

INVENTOR.
LEONARD MEYERHOFF
BY
*Kenyon & Kenyon*
ATTORNEYS

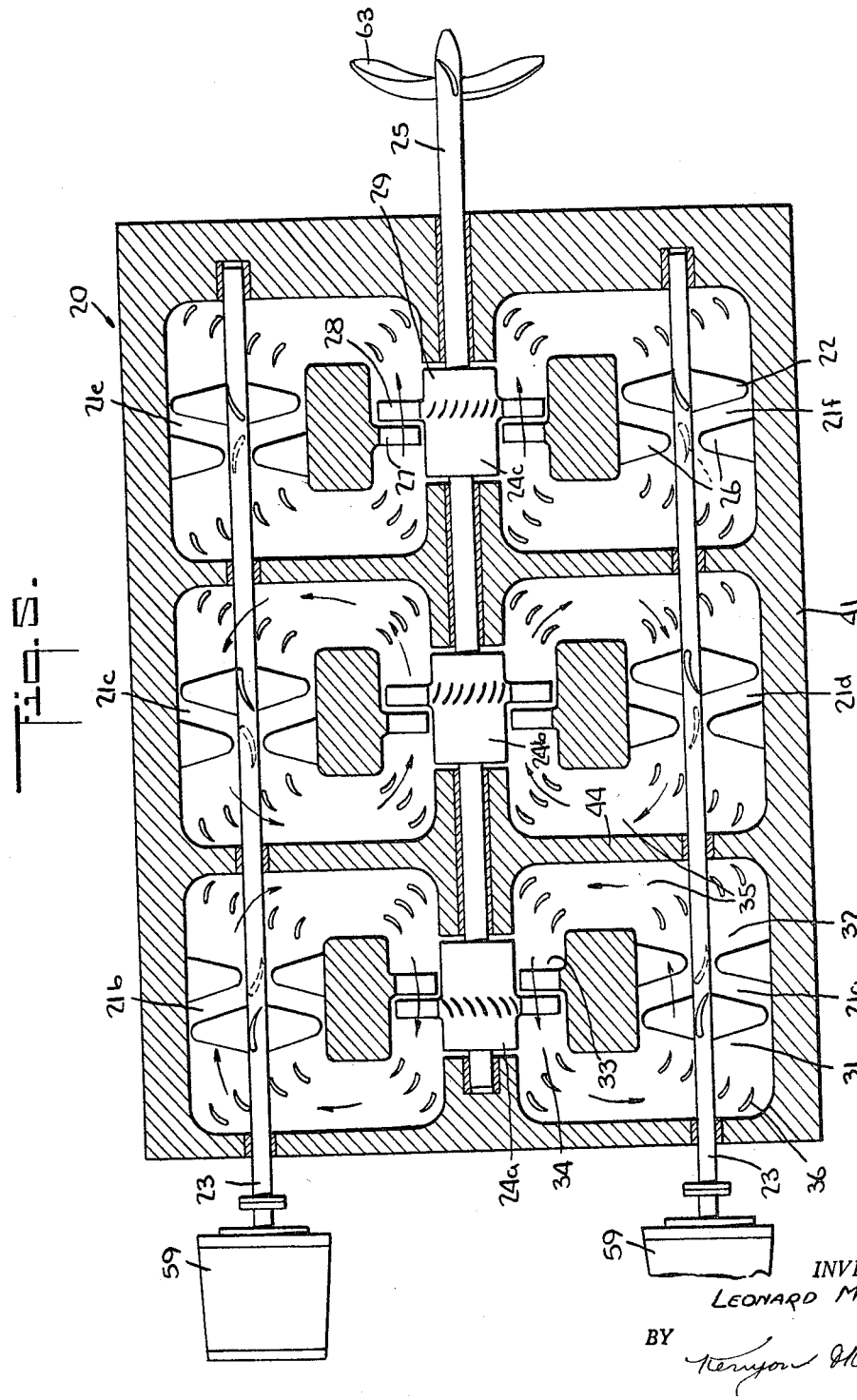

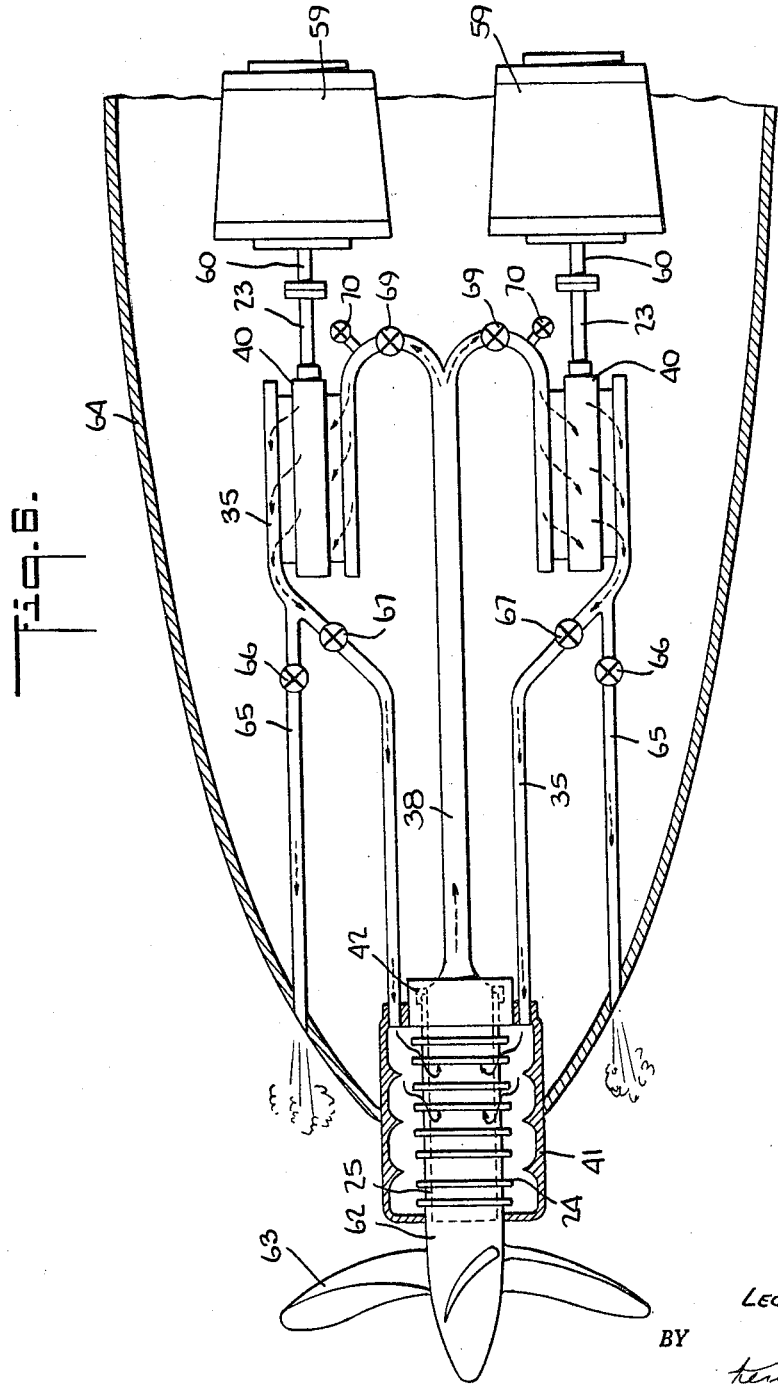

3,285,011
HYDRAULIC TORQUE CONVERSION APPARATUS
Leonard Meyerhoff, Brooklyn, N.Y., assignor to Eastern Research Group, a partnership
Filed Feb. 25, 1960, Ser. No. 11,057
7 Claims. (Cl. 60—221)

This invention relates to hydraulic transmission systems and apparatus of the hydrodynamic type. More particularly, the invention relates to such systems and apparatus used for effecting speed reduction during the transmission of mechanical power from a drive member, such as the rotating shaft of an engine, to a driven member, such as a power take-off shaft. The principal apparatus of a hydraulic transmission system intended for such purpose, and that with which this invention is primarily concerned, is more commonly known as a torque converter.

The embodiments of the invention to be described were developed during the course of a study relating to speed reduction systems and apparatus for use in ships as part of the main propulsion machinery and, therefore, the invention will be described in connection with such use. However, it will be understood that the range of application of the invention includes mechanical power transmission use in other fields such as railroad, stationary power generating machinery and perhaps automotive and airplane locomotion.

In all of such fields of application, the invention is especially useful in transmitting very high power from an extremely high speed shaft to another shaft where the speed reduction ratio between the shafts is intended to be relatively high. These requirements must be met when designing marine propulsion systems and machinery where power from a relatively high speed engine must be transmitted to rotate the ship's propeller at relatively low speed. High speed, high efficiency engines are now available. For example, a modern steam turbine for use as a main propulsion engine in a ship may develop tens of thousands of shaft horsepower (S.H.P.) at a speed of from 4000–6000 revolutions per minute (r.p.m.), and this relatively high horsepower must be efficiently transmitted to a propeller shaft intended to rotate at about 125–200 r.p.m. To do this, speed reduction apparatus must be selected which is adaptable both to the requirements of the speed reduction system and to overall design considerations affecting the ship.

The use of a hydraulic transmission system in ships as the primary means to effect speed reduction is known. Such has not been widely adopted, however, largely for the reason that it has been thought the system is relatively inefficient in high power, high speed reduction ratio applications, that is ratios greater than 20 to 1, because of proportionately increased fluid heads, losses incurred to attain high pressures, line losses and other problematical considerations which compel delicate design of apparatus which also becomes proportionately large and relatively inefficient.

Accordingly, it is an object of the present invention to provide an efficient speed reduction system and apparatus which will be relatively compact in size and weight for the amount of power transmitted and the speed reduction ratio requirements of the system. The system should have the additional advantages of being comparatively noiseless in operation and capable of absorbing operational shock, and should be economical to install and maintain. These objects are especially intended to be achieved in applications where very high horsepower must be transmitted accompanied by substantial torque conversion, or speed reduction.

A further and distinct object of the invention is to provide a hydraulic torque converter and a system incorporating such apparatus for use in ships, such as surface vessels and submarines, as a primary means for transmitting main propulsion engine power to a propeller of the ship. It is intended that the invention be generally compatible with all types of engines.

Generally, these objects are achieved by providing a comparatively high volume output (i.e. high mass flow rate) type fluid pump, such as an axial flow blade type pump, whose impeller shaft is driven by, for example, the main propulsion engine of a ship such as a steam turbine, the pumped fluid driving a turbine having reaction type blading, which constitutes, in effect, a hydraulic motor. In turn, the hydraulic turbine drives the ship's propeller shaft and consequently its propeller. The apparatus and system is arranged and constructed to provide torque multiplication during the transmission of power, and attending speed reduction.

It may be said that the approach of the invention has been to provide means which cause a high volume of transmission fluid to flow under only moderate pressure head between the pump and turbine of the torque converter as compared with other hydraulic systems for a similar purpose. One of the means of the invention which achieves the high volume fluid flow is orientation of the pump's outlet opening and hydraulic turbine inlet opening in relatively spaced apart relationship to each other as compared with other integrated apparatus of the kind. It is believed that among other things, this provides proper operating conditions for the pump itself as well as permitting an arrangement of the apparatus to provide the same for the turbine. Thus, de-emphasis of fluid flow head, and emphasis of flow volume in the design brings about reduction in losses, promotes reduction in the overall size of the equipment, and actually permits the hydraulic motor to be located a considerable distance from the pump.

Further generally describing the invention, when transmission fluid supply to the turbine is to be increased, additional pumps serving the same turbine are provided, and these are arranged so that their respective fluid outputs flow in parallel relationship to each other as compared with staged, or series flow relationship. The present invention provides a plurality of axial flow blade type single stage pumps on either a common impeller shaft, or more than one shaft, depending upon preference in a given application. Further, it will be seen that the present inventive construction permits full, 360-degree perimeter inlet of the pumped fluid into the turbine. Duct means which provide passageways for the fluid between the pump outlets and the turbine inlet, are rather long as compared with prior art constructions. Stationary fluid guide vanes are preferably located within the passageways usually near bends in the ducts. The ducts may extend from the turbine outlet back to the inlets of the pumps to provide a closed, fluid recirculating arrangement. Water may be used as the transmission fluid, and to prevent blade cavitation losses at high pump speeds, the water may be maintained under considerable static pressure.

Further, while multiple staged turbines are well-known it has been discovered that the speed reduction ratio, or amount of torque conversion provided by the apparatus of the present invention can be fixed and determined without regard to engine drive or pump speed simply by providing one or more turbine stages. Of course, relative diameters of the pumps and turbine also may be changed to achieve some similar effects, within size limitations.

In addition it has been found that the power transmission capability of the apparatus can be multiplied by arranging the turbines of the apparatus, where more than one is used, in parallel relationship with each other. In the present invention, this is provided by partitioning of the transmission fluid duct, means to cause separate circulation of a portion of the fluid to each turbine, thereby providing pump-turbine "cartridges," as will be shown.

The invention also provides an efficient speed reduction system for use together with main propulsion machinery in a ship, as will become apparent. The system includes a propeller reversing stage, and a ring valve arrangement in the turbines of the apparatus to provide reversing means which are independent of the direction of rotation of the main engine shaft, and that of the fluid pumps of the system.

These and other objects and features of the invention will be more fully understood from the following description thereof when taken with reference to the accompanying drawings in which:

FIGURE 1 is a sectionalized view of a form of torque converter for use in a speed reduction system of a ship;

FIGURE 3 is a schematic representation showing a modified form of arrangement of the principal components;

FIGURE 5 is a schematic representation similar to FIGURE 2 to show another modified form of arrangement of the principal components;

FIGURE 6 is a schematic representation of another arrangement of the principal components of the apparatus; and FIGURE 7 is a schematic representation of still another modified arrangement of the invention.

Figure 4:
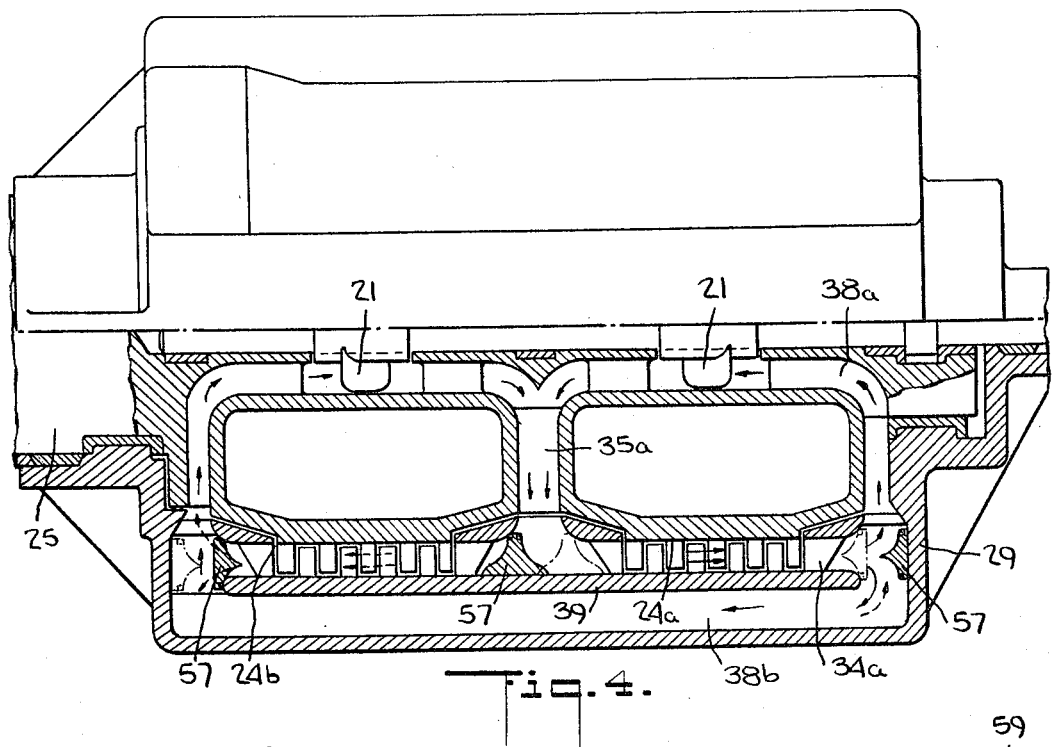
FIGURE 4 is a schematic representation similar to FIGURE 2 to show another modified form of arrangement.

Referring to FIGURES 1-5, torque converter apparatus 20 of the invention has one or more high volume output type pumps 21a-h, each having an impeller 22 mounted on an impeller shaft 23. Impeller shafts 23 are connected to a drive member to be rotated thereby. The pumps are intended to supply a comparatively high volume of transmission fluid to turbines 24a-d causing their rotation and consequent rotation of the power output or take-off shaft 25 of the apparatus, upon which the turbines 24 are mounted.

While the objects of the invention might be achieved by using any high volume type pump capable of being coupled to a high speed drive member, either known or yet to be developed, it has been found that an axial flow blade type pump having a constant internal cross section is excellent for the purpose. Thus, in all of the embodiments shown, the pump impeller 22 consists of a row of moving blades which, for purposes of the present description are also designated by the numeral 22. A plurality of blades will be used on the impeller. Further, each pump 21 has but one stage, comprising the impeller 22 with or without one or more rows of stationary blades 26 which may be located upstream or downstream as a matter of design preference. These blades 26 may be disposed upstream of the impeller and oriented to produce a prewhirl in the fluid to rotate the fluid entering the pump in the same direction as the pump impeller rotation to reduce excessively high relative and absolute velocities in the system which may become excessively high by virtue of imposed design conditions. In any event, where reference herein is made to a pump 21 of the apparatus or system, it will be understood that a single stage pump is meant, its stage including the stationary blading when adopted.

Similarly, turbine 24 may have one or more stages, determined as will be later described. Usually, the fluid is introduced into the turbine 24, which is preferably of the axial flow type, by causing it to flow through a row of stationary blades 27, disposed at the inlet side of the turbine and commonly referred to as a nozzle, from whence it flows through a row of moving blades 28 mounted in the turbine wheel or drum 29 to impart rotative movement thereto, and thereafter through another row of stationary blades 30 at the outlet side of the row of moving blades. In any event, where reference herein is made to a single turbine "stage," a single row of moving blades is referred to, whether or not a row of stationary blading is associated therewith.

For reference purposes, each pump 21 may be said to have a fluid inlet opening 31 and a fluid outlet opening 32, usually formed by the surrounding casing, defined by the planes of the outer edges of the outermost pump blading at those respective sides, or ends of the pump, which are perpendicular to the line of fluid flow. In like manner, and for reference purposes, a turbine 24 may be said to have a fluid inlet opening 33 and a fluid outlet opening 34 defined by the surrounding structure and the plane perpendicular to the line of fluid flow at the outer edge of the outermost blading of the turbine at its inlet and outlet sides, respectively. Preferably, the fluid passageway between the inlet opening 33 and the outlet opening 34 of the turbine 24 has a constant cross-section.

Enclosed duct means 35 provide a passageway for the flow of fluid from the outlet opening 32 of the pump 21 to the inlet opening 33 of the turbine 24. Thus, these fluid openings of the pump and turbine are in spaced apart relationship to each other, as compared with usual torque converter apparatus where these openings are intended to be as close to each other as possible to minimize line losses, and perhaps for other reasons. By the present invention, therefore, space is provided between the primary components in which a fluid flow pattern may be established to promote the efficient operation of both. Careful design of the duct means 35 will directionalize, and create favorable conditions of fluid flow at the pump outlet and turbine inlet, thereby minimizing losses in both of the units. Line losses within the duct means 35 itself can be minimized by careful design thereof, which may provide inclusion of stationary fluid guide blades 36 within the passageway at bends in the duct and at other locations in the line of flow. At duct bend locations, stationary blades 36 promote cascade flow of the fluid therearound. However, these guide blades may be omitted altogether.

The transmission fluid of the system is introduced through suitable ports in the apparatus. Any of the many known types of transmission fluid may be used, but a feature of the speed reduction system of this invention is that water may be used for the purpose. Where the apparatus is used aboard ships, in times of emergency this feature may have considerable importance because of the ready availability of replenishment supply. The transmission fluid interconnects the pumps 21 with the turbine 24 of the apparatus so that when the pumps are driven by the drive member, the fluid is forced by the pumps through the turbine to cause its rotation. Since the rotating turbine wheel 29 is fixed on the power output shaft 25 of the apparatus, the latter also rotates in response to pumping of the fluid, whereby the power imparted to impeller shaft 23 by a drive member (not shown in FIGURES 2-3) is transmitted to the output shaft 25. In the embodiments shown, speed reduction rather than increase is intended, but the opposite might be caused to occur by altering the relative sizes of the components.

Figure 2:
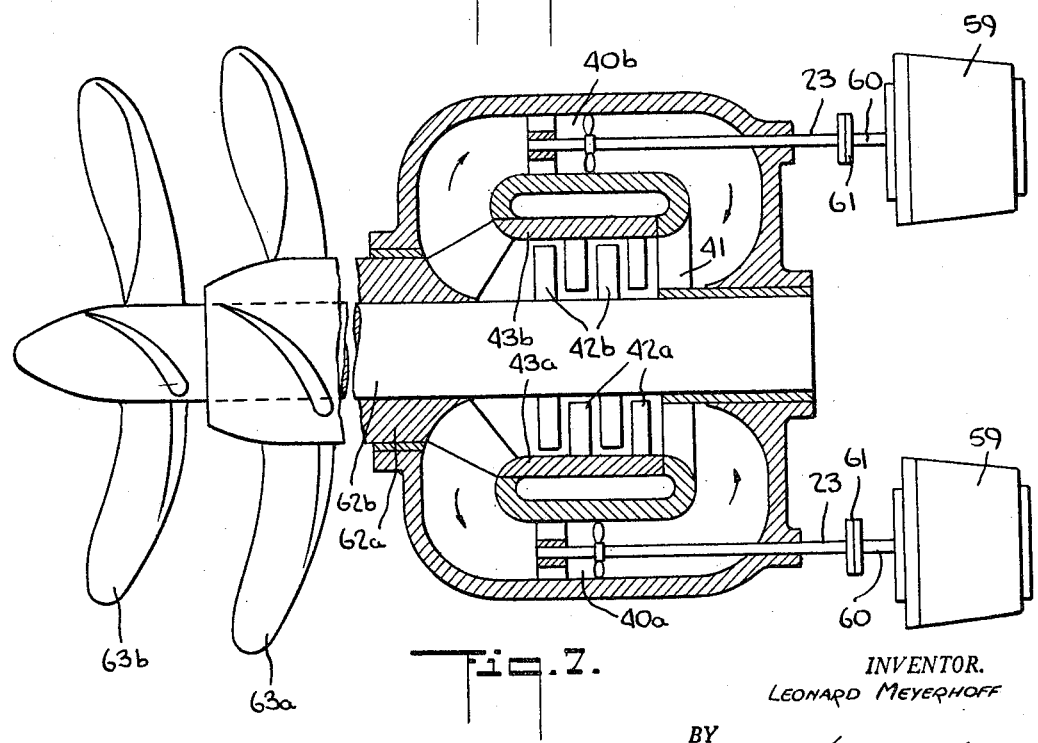
FIGURE 2 is a schematic representation of torque converter apparatus embodying the invention to show the principal components and arrangement thereof.

In elemental form, the apparatus of the invention might only require one pump 21 serving one turbine 24, and the latter may have but a single stage. However, more than one pump may be used to provide greater volume of fluid to the turbine, increasing the amount of power transmitted and increase the r.p.m. reduction ratio. As shown in FIGURES 1-3 and 5, where a plurality of pumps are employed to serve a single turbine, the fluid outlet opening 32 of each pump is arranged in parallel relationship with that of every other pump to effect parallel relationship between the flows of fluid outputs from all the pumps. This effects substantial increase in flow volume of all the fluid from the pumps which serve the same turbine, while only moderately increasing the flow head of pressure of that fluid. Thus, rather than by adding multiple pump stages which, in effect, amounts to adding pumps to the system in series, the flow volume of the system is increased by adding single stage pumps in parallel relationship with respect to the flow from all of them. For example, as shown in FIGURE 1, the output fluid flow from pump 21a is in parallel relationship with that from any of the other pumps. In FIGURES 2 and 3, the flow from the pump 21a to turbine 24 in each arrangement is parallel to the flow from the pump 21b. Referring to FIGURE 5, this relationship is also true with respect to the flows from pumps 21c and 21d to turbine 24b, and from pumps 21e and 21f to turbine 24c. It is seen, therefore, that spacing apart of all of the pump outlet openings 32 from the turbine inlet opening 33 provides space for the efficient arrangement of a plurality of pumps 21, and for inclusion of duct means 35, to cause parallel fluid flow. In this respect, it is to be noted that the impellers 22 themselves or, alternatively speaking, the pumps 21 themselves, may be in series arrangement, as shown by FIGURE 1 and by FIGURE 5 wherein several pump impellers 22 are mounted on a common shaft 23, yet the fluid outflows from all of them may have parallel relationship. Certain pumps, for example, pumps 21a and 21b in FIGURES 2 and 3, are themselves in parallel relationship. It may be said, therefore, that regardless of whether the pumps 21 themselves are arranged in series or parallel with each other, so long as the fluid outlet openings 32 of all of the pumps 21 in a given apparatus are arranged in parallel relationship with respect to the fluid outputs of each of them, the objects of the invention may be achieved.

Referring to several of the many variations in arrangement of the pump and turbine components of the apparatus which are possible according to its intended use, FIGURE 1, shows a plurality of pumps 21 each of which is driven by a single drive member 59.

FIGURES 2 and 3 show a form of the invention, the apparatus being of "built-up" construction including duct means 38 between outlet opening 34 of the turbine 24 and inlet openings 31 of the pumps 21 which, together with duct means 35, provides an enclosed, recirculating passageway for the transmission fluid. The turbine 24 is enclosed in its own casing 39, as are the pumps 21 in their respective casings 40. All of the apparatus is encased in a transmission housing 41. In this embodiment, two single stage, axial flow, blade type pumps serve a two-stage turbine 24 which has a nozzle block 27 at its entrance.

As shown in FIGURE 2, appropriate axial thrust bearings 42 and 43 are provided on the power take-off shaft 25 and the power input or pump impeller shafts 23, respectively. This arrangement, as shown, transmits the power from two engine prime movers (not shown) to a single power take-off shaft 25 by coupling each engine to one of the impeller shafts 23. Alternatively, a single engine might be appropriately geared, or otherwise coupled to both impeller shafts 23 for transmission of its power to the shaft 25.

FIGURE 2 also shows means whereby the apparatus may be adapted for use in a speed reduction system where extremely high blade velocities and power transmission is involved. Transmission fluid, such as water, is supplied through the ports 37 at duct means 38 by a pneumatic tank arrangement, as is well known for the purpose. Pneumatic tank 46 has a fluid supply line 47, with a suitable valve 48 therein, and a fluid outlet line 49, also with a valve 50 therein, the latter connected to ports 37, as shown. The fluid recirculating passages are filled completely. A back pressure relief valve 51 is provided. Where high blade speeds are involved, blade cavitation may be great. Therefore, to prevent loss of efficiency, it is preferable to provide means for placing the fluid under, and maintaining considerable static pressure during operation of the system. Such means are provided, for example, by fluid pressurizing and fluid replenishment pumps 52 which apply static pressure of, say, 200–300 p.s.i. continuously during operation to the fluid of the system. This pressure is furnished through pressure lines 53 leading to pressure ports 54 in duct means 35. Pressure lines 54 have suitable valves 55 therein. Such static pressure will reduce or eliminate blade cavitation, thereby increasing the efficiency of the pumps and of the system.

It should be apreciated that each of the embodiments may have such a pressurizing system and in case of failure thereof it should also be realized that each embodiment may be provided with a valved duct which extends between the recirculating passages and the exterior of the vessel 30 so that in submarine use this duct may be opened at 200–300 feet below the surface to provide such static pressure and permit full power utilization without cavitation. It is also possible to operate a pressurized system, even though the pressurizing apparatus is rendered inoperative, on the surface efficiently absorbing approximately 50% of the maximum prime mover power.

FIG. 4 is intended to show how a plurality of pumps 21 on the same impeller shaft 23, might be arranged interiorly of the turbine wheel, or drum 29. Of course, the pump impeller shaft 23 is driven by a drive member or engine (not shown) as in the other embodiments, and the turbine is connected to the power take-off shaft 25, as in other embodiments. In this embodiment the fluid flow from both pumps 21 is directed, as indicated by the arrows, to serve one turbine 24a with the fluid flowing from both pumps 21 through passageway 35a and then splitting adjacent the turbine outlet opening 34a so that half of the fluid returns to the inlet end of one pump through interior passageway 38a and the other half of the fluid returns to the inlet end of the other pump through passageway 38b which is outside the converter casing. This embodiment provides means for reversing the direction of rotation of the driven shaft 25 without reversing the direction of rotation of the pumps 21. This means is comprised of ring valves 57 which are adapted to slide to the dotted line positions shown to thus direct the fluid flow from both pumps to serve turbine 24b in a like manner, as indicated by the dotted arrows. The movable blades of turbine 24b are so oriented that the direction of rotation of the driven shaft 25 will be reversed when the fluid flows therethrough in the direction indicated by the dotted arrows.

FIGURE 5 shows how several pump-turbine combinations might be "stacked," or arranged "cartridge-fashion," to drive a single power take-off shaft 25, yet each parallel pair of pumps together with its associated turbine may recirculate its own separate portion of all of the transmission fluid of the system. This is accomplished by appropriate placement as shown by FIGURE 5 of fluid partition means 44 between the duct means 35. Compare FIGURE 1 with respect to the flow from pumps 21a and 21d, for example. If desirable, for the purpose to be described, fluid drain ports (not shown) may be provided in each of the pump-turbine units. This arrangement may provide several advantages. For example, drainage of one unit during operation with an appropriate reduction of prime mover power would enable the remaining cartridges to function in their normal manner. Alternatively, at least one of the units, such as turbine 24c together with its pumps 21e and 21f, might have its blading and fluid passages arranged so that it serves as a reversing turbine to be kept drained while the forward units are operating. When reversed operation is desired, the forward units can be quickly drained of fluid, and the reversing unit quickly filled, to provide reversed directional rotation of take-off shaft 25 without changing the direction of rotation of the pump impeller shafts 23, or that of the drive members 59. These drive members 59 may be comprised of two steam turbines of the cross-compound type. These drive members need not be identical and still they can be connected to properly selected pumps so that each drive member-pump set will deliver the same static pressure and flow velocity at the propeller drive turbine inlet to assure matching flows at that point. For instance, assume forty thousand (S.H.P.) cross-compound LP and HP drive members, one designed to rotate at 3,000 r.p.m. and the other at 1,000 r.p.m. and each designed to absorb 20,000 horsepower. Matched turbine inlet flow can be assured by selecting two different sized pumps and pump hubs.

Of course, the component parts of the apparatus, in all of the arrangements, might be encased in a cast housing, or other structure having the fluid duct form integrated therein. Further, it should be noted that all of the arrangements provide full, 360-degree perimeter, fluid entrance and exit from the turbine 24, thereby increasing turbine operating efficiency. The direction of flow of the fluid from the pumps to the turbine may be such as to balance the axial thrust during operation of the output shaft, or to balance pump axial thrust where several pumps are used, or to do both. This will be readily apparent from the drawings without further explanation. It is also apparent that, where axial thrust of the parts is balanced, the size of the thrust bearings of the apparatus can be considerably reduced.

From the several arrangements of the apparatus as shown by FIGURES 1–5, it is apparent that a feature of the invention is its adaptability to many alternative arrangements and constructions. The availability of such a wide choice of arrangements in such apparatus should eliminate many problems presently confronting the power plant designer.

The cross-sectional configuration of all of the blading of the apparatus, including pump and turbine moving and stationary blades and stationary guide blades within the fluid passageways, is generally of reaction type blade shape, as opposed to impulse type blade configurations. In pressurized systems all blades have standard NACA sections of modifications thereof. In non-pressurized systems one alternate possibility for the pump is to use super-cavitating blade sections.

Pump impeller blading 22 is constructed having greater blade pitch variation along the length of the blade than the other blading of the apparatus. It is suggested that impeller blading 22 be composed of NACA Series 65 blade sections. It is preferred that the pump impeller blading have a high solidity of the order of 1.5 at the root and .7 at the tip for greatest efficiency.

The turbine blading preferably has a solidity of about 1.5 at each radius. This solidity is substantially constant from root to tip due to the large relative hub radius as compared to the blade radius.

It has been found that variation in the speed reduction ratio afforded by the apparatus can be brought about simply by altering the number of stages in the turbine 24, all other design characteristics remaining substantially the same. This is shown by the equation, in general form, for speed reduction ratios in hydraulic torque converter apparatus for the case where the pumps of the system are arranged in parallel relationship with respect to the direction of fluid output flows from each of them, which general form equation is:

(1) $$\frac{N_p}{N_t} = \left(\frac{D_t}{D_p}\right)\sqrt{n_t \cdot f(x)}$$

where $N_p$ = Pump speed in revolutions per second (r.p.s.),
$N_t$ = Turbine speed in r.p.s.,
$D_t$ = Diameter of turbine,
$D_p$ = Diameter of pump,
$n_t$ = Number of stages in the turbine, and
$f(x)$ = A function of flow geometry variable $x$, not relevant here.

The similar general form of the r.p.m. ratio equation for the case where the pumps are in series arrangement with respect to the direction of output flow from each of them (i.e., staged relationship) is:

(2) $$\frac{N_p}{N_t} = \frac{D_t}{D_p}\sqrt{\frac{n_t}{n_p} \cdot f(x)}$$

Comparison of Equations 1 and 2 shows:

(3) $$\frac{N_p/N_t \text{ Parallel}}{N_p/N_t \text{ Series}} = \sqrt{n_p}$$

This shows that for the same quantities in Equations 1 and 2 the r.p.m. reduction ratio of the parallel arrangement is greater than that of the series arrangement by the square root of the number of pumps. From Equation 1 it may be noted that the number of pumps, or pump stages is not a directly appearing factor, whereas the number of pumps or pumping stages is a factor in the similar general form of Equation 2 for the case where the pumps are in series arrangement with respect to the direction of output flow from each of them (i.e., staged relationship). Equation 2 shows that an increasing number of series arranged pumps will lessen the attainable r.p.m. reduction ratio, all other quantities in this equation are constant.

Thus, by Equation 1, as the number of turbine stages is increased, the speed reduction ratio of the system is also increased at a greater rate than the series arrangement of Equation 2. It can be shown that the parallel pump system allows greater freedom in the choice of turbine proportions than the series system and in many instances the parallel system leads to a useful design where the series case may not. Where the parallel system is installed in a ship, this means that addition of turbine stages will afford slower propeller speed independently of the speed of rotation of the pump ($N_p$), and of the respective diameters of the pump or turbine ($D_p$ or $D_t$).

It has also been found that parallel arrangement of turbines or turbine stages, with respect to the direction of fluid flow to each of them, multiplies the power transmission capacity of a given system. Thus, the "stacked," or "cartridge" arrangement of pump-turbine combinations, as shown by FIGURE 5, wherein each unit combination recirculates its own fluid supply, may have advantages by multiplication of power capacity of the system as compared to the same general arrangement, but wherein the flow of fluid to all of the turbines, or stages thereof, is in series relationship.

Typical apparatus for installation in a primary speed reduction system for marine use is shown by FIGURE 1. In this arrangement, two two-stage turbines 24a and 24b, each served by four pumps 21a–d and 21e–h, respectively, are used to transmit power with accompanying speed reduction from two power input, or pump impeller shafts 23 to the take-off shaft 25. Other essential component parts of the apparatus and their general arrangement will be readily understood from the reference numerals thereon by comparison with the above description and other figures of the drawings. However, two additional turbines 24c and 24d are shown connected to the take-off shaft reversing turbines. These turbines 24c and 24d will not be in operation, that is, interconnected by transmission fluid to the pumps 21a–d and 21e–h, respectively, while turbines 21a and 21b are in operation to rotate take-off shaft 25 in a forward rotational direction. Five ring type reversing valves 56 are provided on the turbine drum 29, each being mounted for sliding movement in the direction of the axis of rotation of the turbine drum, as shown. The valves 56 are coupled together by means (not shown) for concurrent movement of all of them, to their respective necessary positions to effect the reversal of rotation of take-off shaft 25, as will be described. These means will extend through and be operable from outside of the apparatus housing 41. Thus, each valve 56 may be moved along sleeve surface 57 of the turbine drum 29, the valves 56 sliding on surfaces 58 thereof. Each may be moved to be positioned against proximate turbine inlet openings or outlet openings, as the case may be, to effect a shunting of the fluid flow away from the inlet opening or outlet opening of a forward turbine to one or the other openings of a reversing turbine, and vice versa, as will be readily understood from a study of FIGURE 1. Thus, when the direction of rotation of the take-off shaft 25 is to be reversed, such is achieved independently of, and therefore without regard to, the direction of rotation of the pumps 21a–h and consequently that of the engine drive shafts (not shown) to which the pump impeller shafts 23 are connected.

Another marine propulsion arrangement including the reduction system of the invention, is shown schematically by FIGURE 6. Here, twin steam turbines 59 have their drive shafts 60 connected to impeller shafts 23 of pump sets 40. Relatively extended fluid outlet duct means 35 from the pump sets 40 form one or more fluid passageways (also represented by numeral 35) leading to the turbine casing 41 which houses the turbines 24 in a location remote from the pump sets, near the propeller 63. A single duct means 35 from each pump set 40 to turbine casing 41 is shown, but more than one on each side could be used. The transmission fluid whose direction of flow is indicated by the arrowheads is recirculated to pumps 40 from the fluid outlet openings (not shown) of the turbine 24 by duct means 38. A location for the propeller shaft thrust bearing 42 is indicated. Thus, the advantages of having a hydraulic motor in close proximity to propeller 63 may be obtained by use of the apparatus of the invention, extended duct means 35 and 38 between said motor and the pumps being afforded without substantial reduction of system efficiency, and such is within the contemplation of the invention. A variant of this embodiment may be constructed by moving the turbine 24 aft so that it is completely outside the hull 64 with the bearing 42 interposed between the turbine and the hull with suitable supports extending from the hull to the duct 38 and the non-rotating portions of the turbine. In this embodiment the propeller 63 may be mounted directly on the rotating drum of the turbine.

In FIGURE 6, the outline section of the hull of the ship is represented by the numeral 64. In this arrangement, there is also shown a feature of the invention which is common to all of its arrangements and embodiments although it is not shown in the other drawings. This feature is the ability of the system to provide "take home" fluid jet locomotion of the ship in the event of breakage of the ship's propeller 63, or its propeller shaft 62. Such may be obtained due to the relatively high volume of fluid output from the axial flow, blade type pumps in parallel relationship with respect to the direction of fluid flow from each of them. A turbine by-pass duct means 65 is connected to each of the pump outlet means 35 and leads into the sea near the propeller 63 through the hull plating 64. Suitable valves 66 and 67 are located within the duct means 65 and 35 to be opened and closed, respectively, to cause the high volume of transmission fluid pumped by pump sets 40 to be expelled into the sea, by-passing the turbine unit 41. This provides a fluid jet propulsion system of the ship adequate to keep it underway, at reduced speed, to effect a voyage to port for repairs. Transmission fluid inlet to pump sets 40 is either by pump suction from the seal through a fluid inlet duct (not shown) near the propeller, or by another supply duct means 70 leading into pump inlet duct means 38. These are indicated as accompanied by shut-off valves 69 in the drawing. When the latter is used, the portion of duct means 38 leading from turbine 41 is closed to the pump sets 40 by valves 69. Alternative means and arrangements for "take home" power purposes are, of course, suggested.

FIGURE 7 suggests an arrangement of the system and apparatus of the invention whereby propulsion power from two steam turbines of a ship may be transmitted to two concentrally arranged propeller shafts 62a and 62b to drive two counter rotating propellers 63a and 63b thereof.

The drive shafts 60 of turbines 59 are coupled by means 61 to impeller shafts 23 of the two pump sets 40a–b, each of which are schematically shown as a single pump but each of which may have a plurality of pumps (not shown) therein. Both pump sets 40a and 40b pump fluid through the turbine 41 from opposing sides thereof. This fluid drives the turbine impeller blades 42a, which are interconnected to the outer propeller shaft 62a by means of member 43a having spokelike portions interconnecting the turbine drum and the outer shaft 62a in one direction and drives the blades 42b, which are interconnected to the inner propeller shaft 62b by means of member 43b, in the opposite direction. Alternate arrangements are obviously suggested by the arrangement shown. It is obvious that the turbine blading in each turbine unit 41a and 41b is mounted oppositely to that in the other so that the propellers 63a and 63b will rotate in opposite directions during movement of the ship.

In all arrangements of the system and apparatus when used as primary speed reduction means of a ship, the components of the apparatus will be small in size, weight and space requirements as compared to those factors in other drive systems. The various arrangements of the apparatus of the invention which become available causes the speed reduction system of the ship to be extremely compact as compared with other presently known systems. For instance, as presently designed, it is possible to utilize two pumps each absorbing 7500 S.H.P. at 6000 r.p.m. delivering to one turbine 15,000 S.H.P. at 200 r.p.m. with an overall length of the converter of about 8 feet with ahead and astern units and the lateral area of the converter contained within a width of about 5 feet. This converter has an efficiency greater than 82%. By careful design, including attention to the respective diameters of the pump and turbine components, to the number of pumps and the number of turbine stages to be served by one or more pumps, to the duct means, and to the arrangement of the parts of the system, all of which are subject to variation, speed reduction ratios above 80 to 1 can be relatively efficiently achieved.

Thus, a hydraulic speed reduction system and apparatus has been described which is useful for transmitting mechanical power from a relatively high speed drive member to a driven member intended to rotate at altered speed with respect to that of the drive member. Furthermore, the system and apparatus achieves all of the objects of the invention. Of course, it is understood that those having skill in the art may modify the system and apparatus by means which are the equivalents of one or more of those provided. However such modifications would be within the scope of the appended claims.

I claim:

1. Hydraulic transmission apparatus for transmitting high power within a ship from a plurality of drive shafts each having extremely high rotational speed to a driven shaft, said apparatus comprising a plurality of comparatively high volume output type single stage axial flow pumps each having an impeller shaft adapted to engage a different drive shaft and each having a transmission fluid outlet opening, said pump fluid outlet openings arranged in parallel relationship with respect to the transmission fluid output of each of them, a turbine adapted to engage said driven shaft and having a transmission fluid inlet opening, said fluid inlet opening of the turbine comparatively spaced apart from said fluid outlet openings of the pumps, duct means between said fluid inlet opening of the turbine and said fluid outlet openings of the pumps providing passageway for transmission fluid for interconnecting the pumps and the turbine, means for supplying said fluid to said pumps, said turbine being conditioned to rotate in response to a predetermined flow of fluid at a speed different than the speed of the pumps providing said predetermined flow thereto, additional duct means, means connected to said additional duct means for producing a fluid jet extending without said ship, means for selectively delivering sea water from without said ship to at least one of said pumps, and means for selectively by-passing the flow of sea water of at least one of said pumps from said turbine to said additional duct means, said apparatus so arranged and constructed that when said apparatus is transmitting said power the speed of rotation of said turbine and said driven shaft is substantially different from that of said drive shaft.

2. Hydraulic torque converter apparatus for a ship comprising a plurality of axial flow type single stage pumps each adapted to receive power to be transmitted by said apparatus and each having a transmission fluid outlet opening, said pump fluid outlet openings arranged in parallel relationship with respect to the transmission fluid output of each of them, a turbine adapted for take-off of said power and having a transmission fluid inlet opening, said fluid inlet opening of the turbine being comparatively spaced apart from said fluid outlet openings of the pumps, duct means between said fluid inlet opening of the turbine and said fluid outlet openings of the pumps providing passageway for transmission fluid for interconnecting the pumps and the turbine, means for supplying said fluid to said pumps, additional duct means, means connected to said additional duct means for producing a fluid jet extending without said ship, means for selectively delivering sea water from without said ship to at least one of said pumps, and means for selectively by-passing the flow of sea water of at least one of said pumps from said turbine to said additional duct means.

3. A hydraulic transmission system for transmitting mechanical power within a ship from a plurality of engine drive shafts to a power take-off shaft accompanied by substantial reduction of rotational speed, said system comprising a plurality of comparatively high volume output type single stage axial flow pumps each coupled to different ones of said engine drive shafts to be driven thereby, said pumps arranged in parallel relationship with respect to the transmission fluid output of each of them, a hydraulic motor coupled for driving engagement with said power take-off shaft, duct means forming an enclosed recirculating passageway for transmission fluid between said pumps and said motor, transmission fluid within said passageway interconnecting the pumps and the motor, said motor being conditioned to rotate in response to a predetermined flow therethrough at a speed which is substantially less than the speed of the pumps for providing said predetermined flow thereto, additional duct means, means connected to said additional duct means for producing a fluid jet extending without said ship means for selectively delivering sea water from without said ship to at least one of said pumps, and means for selectively by-passing the flow of sea water of at least one of said pumps from said turbine to said additional duct means, whereby upon rotation of said engine drive shafts said pumps deliver comparatively high volume of said fluid at only moderate flow pressure head to said motor causing its rotation at a speed substantially less than that of said engine drive shafts.

4. A hydraulic speed reduction system for transmitting relatively high mechanical power from two rotating drive shafts driven by at least one relatively high speed main propulsion engine to the propeller shaft of a ship which is intended to rotate at relatively low speed, said system comprising at least one axial flow blade type single stage pump having an impeller shaft engaging one of said drive shafts to be driven thereby and having a transmission fluid inlet opening and outlet opening, at least a second axial flow blade type single stage pump having an impeller shaft adapted to engage the other of said drive shafts to be driven thereby and having a transmission fluid inlet opening and outlet opening, an axial flow blade type turbine in driving engagement and axially aligned with said propeller shaft, said turbine having at least one stage and having a transmission fluid inlet opening and outlet opening each extending circumferentially adjacent the full perimeter of said turbine, said impeller shafts aligned parallel to and disposed on opposite sides of the axis of rotation of said turbine, each of said pumps on each shaft in paired relation to a pump on the other shaft, duct means between said fluid outlet openings and inlet openings of the pumps and respectively said inlet opening and outlet opening of said turbine providing enclosed recirculating passageways for transmission fluid, transmission fluid within said passageways interconnecting the pumps and the turbine, additional duct means, means connected to said additional duct means for producing a fluid jet extending without said ship, means for selectively delivering sea water from without said ship to at least one of said pumps, and means for selectively by-passing the flow of sea water of at least one of said pumps from said turbine to said additional duct means.

5. Hydraulic torque converter apparatus for a ship comprising an axial flow type single stage pump adapted to receive power to be transmitted by said apparatus and having a transmission fluid outlet opening, a turbine adapted for take-off of said power and having a transmission fluid inlet opening, said fluid outlet and inlet openings being comparatively spaced apart from each other, duct means between said fluid outlet and inlet openings providing passageway for transmission fluid for interconnecting the pump and the turbine, means for producing a fluid jet, means for selectively delivering sea water from without said ship to said pump to be urged therethrough, and means for selectively bypassing the flow of sea water of said pump from said turbine to said fluid jet means.

6. Hydraulic torque converter apparatus for transmitting power within a ship from a drive shaft to a driven shaft comprising an axial flow type single stage pump having an impeller shaft adapted to engage said drive shaft and a transmission fluid inlet opening and outlet opening, a turbine adapted to engage said driven shaft and having a transmission fluid inlet opening and outlet opening, said fluid inlet and outlet openings of the turbine being comparatively spaced apart respectively from said outlet and inlet openings of the pump, duct means between said outlet opening of the pump and said inlet opening of the turbine and between said outlet opening of the turbine and said inlet opening of the pump providing an enclosed recirculating passageway for transmission fluid for interconnecting the pump and the turbine, means for supplying said fluid to said pump, means for producing a sea water jet, means for selectively delivering sea water from without said ship to said pump to be urged therethrough, and means for selectively by-passing the flow of fluid of said pump from said turbine to said fluid jet means.

7. Hydraulic transmission apparatus for transmitting high power within a ship from a plurality of drive shafts, each having extremely high rotational speed, to a driven shaft, said apparatus comprising a plurality of comparatively high volume output type single stage pumps each having an impeller shaft adapted to engage a different one of said drive shafts and each having a transmission fluid outlet opening, said pump fluid outlet openings being arranged in parallel relationship with respect to the transmission fluid output of each of them, a turbine adapted to engage said driven shaft and having a transmission fluid inlet opening, said fluid inlet opening of the turbine comparatively spaced apart from said fluid outlet openings of the pumps, duct means between said fluid inlet opening of the turbine and said fluid outlet openings of the pumps providing passageway for transmission fluid for interconnecting the pumps and the turbine, said turbine being conditioned to operate in response to the transmission fluid from said pumps at a speed substantially different from that of said pumps, means for supplying said fluid to said pumps, means for producing a fluid jet, means for selectively delivering sea water from without said ship to at least one of said pumps to be urged therethrough, and means for selectively by-passing the flow of sea water of at least one of said pumps from said turbine, said apparatus being so arranged and constructed that when said apparatus is transmitting said power the speed of rotation of said turbine and said driven shaft is substantially different from that of said drive shaft.

References Cited by the Examiner

UNITED STATES PATENTS

| | | | |
|---|---|---|---|
| 575,158 | 1/1897 | Huebner | 115—16 |
| 891,214 | 6/1908 | Graf | 115—15 |
| 1,049,651 | 1/1913 | Bennett | 103—93 |
| 1,141,812 | 6/1915 | Michell et al. | 60—54 |
| 1,259,753 | 3/1918 | Lassell | 115—15 |
| 1,451,997 | 4/1923 | Michell | 60—54 |
| 1,661,360 | 3/1928 | Clark | 103—93 |
| 1,747,817 | 2/1930 | Choquette. | |
| 2,310,361 | 2/1943 | Ford. | |

FOREIGN PATENTS

| | | |
|---|---|---|
| 443,139 | 7/1912 | France. |
| 26,279 | 1912 | Great Britain. |
| 201,034 | 7/1923 | Great Britain. |
| 203,330 | 5/1924 | Great Britain. |
| 450,763 | 7/1936 | Great Britain. |
| 598,654 | 2/1948 | Great Britain. |

JULIUS E. WEST, *Primary Examiner.*